(12) United States Patent
Harris et al.

(10) Patent No.: US 10,364,705 B2
(45) Date of Patent: Jul. 30, 2019

(54) STRUT ASSEMBLY FOR BEARING COMPARTMENT

(71) Applicant: United Technologies Corporation, Farmington, CT (US)

(72) Inventors: Thomas O. Harris, Windsor, CT (US); Lubomir A. Ribarov, West Hartford, CT (US)

(73) Assignee: United Technologies Corporation, Farmington, CT (US)

( * ) Notice: Subject to any disclaimer, the term of this patent is extended or adjusted under 35 U.S.C. 154(b) by 307 days.

(21) Appl. No.: 15/586,920

(22) Filed: May 4, 2017

(65) Prior Publication Data
US 2018/0320552 A1  Nov. 8, 2018

(51) Int. Cl.
| F01D 25/16 | (2006.01) |
| F01D 9/06 | (2006.01) |
| F01D 25/24 | (2006.01) |
| F01D 25/26 | (2006.01) |

(Continued)

(52) U.S. Cl.
CPC ........... *F01D 25/164* (2013.01); *F01D 9/065* (2013.01); *F01D 25/16* (2013.01); *F01D 25/24* (2013.01); *F01D 25/26* (2013.01); *F16C 19/225* (2013.01); *F16C 19/36* (2013.01); *F05D 2220/32* (2013.01); *F05D 2240/50* (2013.01); *F05D 2260/30* (2013.01); *F05D 2260/38* (2013.01);

(Continued)

(58) Field of Classification Search
CPC .... F16C 27/04; F16C 27/045; F16C 2360/23; F01D 9/065; F01D 25/14; F01D 25/16; F01D 25/24; F01D 25/26; F01D 25/28; F05D 2260/30; F05D 2260/38; F05D 2260/50

USPC ........................................................ 415/142
See application file for complete search history.

(56) References Cited

U.S. PATENT DOCUMENTS 3,860,359 A * 1/1975 De Feo ................... F01D 25/28
                                                  415/208.2
4,213,661 A    7/1980 Marmol
4,872,767 A   10/1989 Knapp
(Continued)

FOREIGN PATENT DOCUMENTS

DE    102014219063 A1    3/2016
EP         2527604 A1   11/2012
(Continued)

OTHER PUBLICATIONS

Extended European Search Report for EP Application No. 18170401.6, dated Sep. 25, 2018, 7 pages.

*Primary Examiner* — Phillip A Johnson
(74) *Attorney, Agent, or Firm* — Kinney & Lange, P.A.

(57) ABSTRACT

A strut assembly for a bearing compartment of a gas turbine engine includes an inner case, an outer case, and a first plurality of struts. The inner case is disposed within the bearing compartment and includes a first axis. The outer case defines an exterior of the bearing compartment and includes a second axis disposed co-axially with the first axis. The inner and outer cases define a flowpath between the inner and outer cases. Each strut of the first plurality of struts extends between and is connected to the inner and outer cases. The first plurality of struts is configured to maintain concentric positioning between the inner and outer cases and to allow relative changes in size between the inner and outer cases without deforming the inner case.

17 Claims, 5 Drawing Sheets

(51) Int. Cl.
   *F16C 19/22*     (2006.01)
   *F16C 19/36*     (2006.01)

(52) U.S. Cl.
   CPC   *F05D 2300/50212* (2013.01); *F16C 2360/23* (2013.01)

(56) References Cited

U.S. PATENT DOCUMENTS

| | | |
|---|---|---|
| 4,979,872 A | 12/1990 | Myers et al. |
| 5,161,940 A | 11/1992 | Newland |
| 5,622,438 A | 4/1997 | Walsh et al. |
| 6,099,165 A * | 8/2000 | Tremaine .............. F01D 25/164 384/535 |
| 7,553,123 B2 | 6/2009 | Casaro |
| 8,733,693 B2 | 5/2014 | Journade et al. |
| 9,046,001 B2 | 6/2015 | Hindle et al. |
| 9,458,856 B2 | 10/2016 | Keegan |
| 2006/0053799 A1 | 3/2006 | Aycock et al. |
| 2008/0078863 A1* | 4/2008 | Lwasa .................... B64D 33/06 244/58 |
| 2012/0321447 A1* | 12/2012 | Dijoud ................... F01D 9/041 415/142 |
| 2015/0361893 A1* | 12/2015 | Klingels ................ F01D 25/26 415/213.1 |

FOREIGN PATENT DOCUMENTS

| | | |
|---|---|---|
| EP | 3115564 A1 | 1/2017 |
| WO | WO00/43687 A1 | 7/2000 |

\* cited by examiner

STRUT ASSEMBLY FOR BEARING COMPARTMENT

BACKGROUND

The present disclosure relates to thermal growth management. More particularly, the present disclosure relates to a strut assembly for accommodating thermal growth between cases in a bearing compartment of a gas turbine engine.

Thermal growth in gas turbine engines continues to be a challenging design space especially as modern gas turbine engines operate at ever-increasing pressure ratios and hotter cores to extract any additional thermodynamic cycle efficiency.

One area in gas turbine engines where differential thermal growth manifests itself is where outer housing surfaces of the engine bearing compartment are exposed to hot gas flows, while the inner housing surfaces of the same bearing compartment are at a much lower temperature. In addition, the housing of the bearing compartment is also frequently exposed to transient thermal gradients (and resulting thermal and mechanical stresses) due to engine start-ups and shutdowns as part of the gas turbine engine's operational cycles.

In certain types of gas turbine engines, bearing compartments of the engine include two physically attached annular structures (e.g., inner and outer cases). The outer case is often exposed to a high temperature environment (e.g., 1000° F./538° C.), while the inner case is often cooled to a lower temperature (e.g., 150° F./66° C.). As a result, the thermal expansion of the outer case pulls the inner case radially outward causing deformation of the inner case. This deformation, or "lobing" of the inner case, results in an inability to properly seal the inner case with its corresponding mating surface, which allows air to leak into the bearing compartment thus reducing the delta pressure between the inside and outside of the compartment. This makes preventing oil leakage out of the compartment difficult.

SUMMARY

A strut assembly for a bearing compartment of a gas turbine engine includes an inner case, an outer case, and a first plurality of struts. The inner case is disposed within the bearing compartment and includes a first radially central axis. The outer case defines an exterior of the bearing compartment and includes a second radially central axis disposed co-axially with the first axis. The inner and outer cases define a flowpath therebetween. Each strut of the first plurality of struts extends between and is connected to the inner case and outer case. The first plurality of struts is resiliently deformable between the outer case and inner case whereby a change in size in one of the outer case and inner case is radially isolated from the other of the outer case and inner case.

A bearing compartment of a gas turbine engine includes a first annular structure, a second annular structure, and a plurality of resilient support elements. The second annular structure defines an exterior of a bearing housing of the bearing compartment and surrounds a portion of the first annular structure. The second annular structure is disposed co-axially with the first annular structure such that the first and second annular structures define a flowpath located radially between the first and second annular structures. The resilient support elements are disposed between the first and second annular structures such that each resilient support element is connected to the first annular structure and the second annular structure. Each resilient support element is configured to radially deform upon thermal expansion of the second annular structure so as to maintain the shape of the first annular structure.

DETAILED DESCRIPTION

The proposed strut assembly includes "flexible" struts as attachment points that allow for the thermal growth of the outer case without the negative consequences of deforming the inner case. When the outer case is subjected to large thermal loads and expands, the proposed struts deform (e.g., from a circular shape into an elliptical shape) while still maintaining the proper gap between the two cases. At the same time, minimal stresses are transmitted to the inner case, thus preventing the occurrences of lobing deformation.

Figure 1:
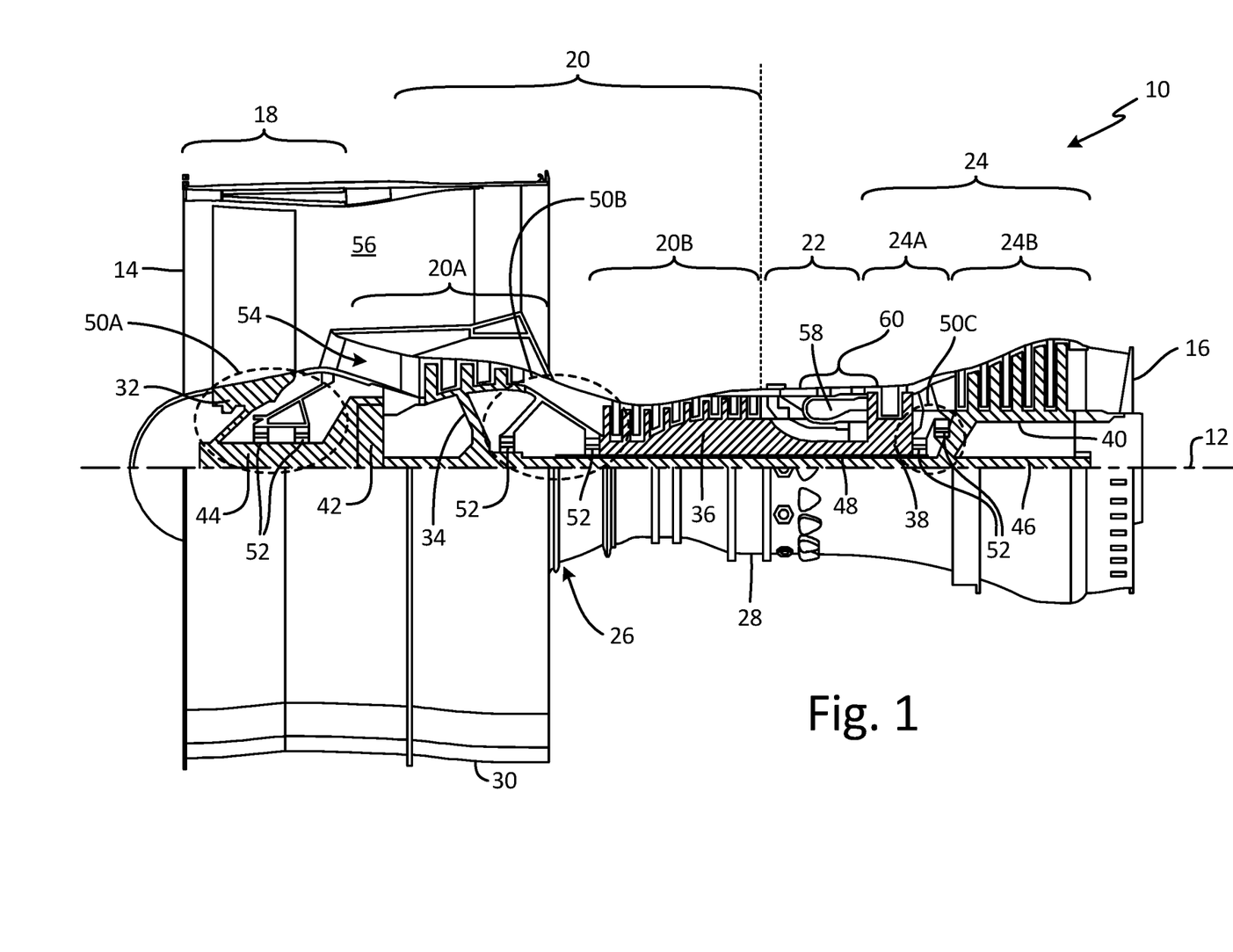
FIG. 1 is a side partial cross-section view of a turbine engine.

FIG. 1 shows a side partial cross-section view of gas turbine engine 10 and includes axial centerline 12, upstream airflow inlet 14, downstream airflow exhaust outlet 16, fan section 18, compressor section 20 (with low pressure compressor ("LPC") section 20A and high pressure compressor ("HPC") section 20B), combustor section 22, turbine section 24 (with high pressure turbine ("HPT") section 24A and low pressure turbine ("LPT") section 24B), engine housing 26 (with core case 28 and fan case 30), fan rotor 32, LPC rotor 34, HPC rotor 36, HPT rotor 38, LPT rotor 40, gear train 42, fan shaft 44, low speed shaft 46, high speed shaft 48, bearing compartments 50A, 50B, and 50C, plurality of bearings 52, core gas path 54, bypass gas path 56, combustion chamber 58, and combustor 60.

Gas turbine engine 10 extends along axial centerline 12 between upstream airflow inlet 14 and downstream airflow exhaust outlet 16. Gas turbine engine 10 includes fan section 18, compressor section 20, combustor section 22, and turbine section 24. Compressor section 20 includes LPC section 20A and HPC section 20B. Turbine section 24 includes HPT section 24A and LPT section 24B.

Fan section 18, compressor section 20, combustor section 22, and turbine section 24 are arranged sequentially along centerline 12 within engine housing 26. Engine housing 26 includes core case 28 (e.g., a core case) and fan case 30 (e.g., a fan case). Core case 28 may house one or more of fan section 18, compressor 20, combustor section 22, and turbine section 24 (e.g., an engine core). Fan case 30 may house at least fan section 18. Each of gas turbine engine sections 18, 20A, 20B, 24A and 24B includes respective rotors 32-40. Each of these rotors 32-40 includes a plurality of rotor blades arranged circumferentially around and connected to one or more respective rotor disks. The rotor blades, for example, may be formed integral with or mechanically fastened, welded, brazed, adhered and/or otherwise attached to the respective rotor disk(s).

Fan rotor 32 is connected to gear train 42, for example, through fan shaft 44. Gear train 42 and LPC rotor 34 are connected to and driven by LPT rotor 40 through low speed shaft 46. The combination of at least LPC rotor 34, LPT rotor 40, and low speed shaft 46 may be referred to as "a low speed spool." HPC rotor 36 is connected to and driven by HPT rotor 38 through high speed shaft 48. The combination of at least HPC rotor 36, HPT rotor 38, and high speed shaft 48 may be referred to as "a high speed spool." Shafts 44-48 are rotatably supported by a plurality of bearings 52, which can be rolling element bearings, thrust bearings, or other types of bearings. Each of these bearings 52 is connected to engine housing 26 by at least one stationary structure such as, for example, an annular support strut.

During operation, air enters gas turbine engine 10 through airflow inlet 14. Air is directed through fan section 18 and is then split into either core gas path 54 or bypass gas path 56. Core gas path 54 flows sequentially through fan section 18, compressor section 20, combustor section 22, and turbine section 24. The air within core gas path 54 may be referred to as "core air." Bypass gas path 56 flows through a duct between core case 28 and fan case 30. The air within bypass gas path 56 may be referred to as "bypass air."

The core air is compressed by LPC rotor 34 and HPC rotor 36 and directed into combustion chamber 58 of combustor 60 in combustor section 22. Fuel is injected into combustion chamber 58 and mixed with the core air that has been compressed by compressor section 20 to provide a fuel-air mixture. This fuel-air mixture is ignited and combustion products thereof expand and flow through and sequentially cause HPT rotor 38 and LPT rotor 40 to rotate. The rotations of HPT rotor 38 and LPT rotor 40, respectively drive rotation of HPC rotor 36 and LPC rotor 34 and compression of the air received from core gas path 54. The rotation of LPT rotor 40 also drives (via gear train 42) the rotation of fan rotor 32, which propels bypass air through and out of bypass gas path 56. The propulsion of the bypass air may account for a majority of thrust generated by gas turbine engine 10, which can be more than 75% of engine thrust. Gas turbine engine 10 of the present disclosure, however, is not limited to the foregoing exemplary thrust ratio. Gas turbine engine 10 of the present disclosure can be a geared turbofan (as shown) or a non-geared turbofan. Gas turbine engine 10 of the present disclosure can be a high-bypass turbofan, either geared (as shown) or non-geared, or a low-bypass turbofan, or a turbojet, or a turboshaft, or a turboprop. Gas turbine engine 10 of the present disclosure can be a two-spool engine (as shown) or a three-spool engine.

Figure 2:
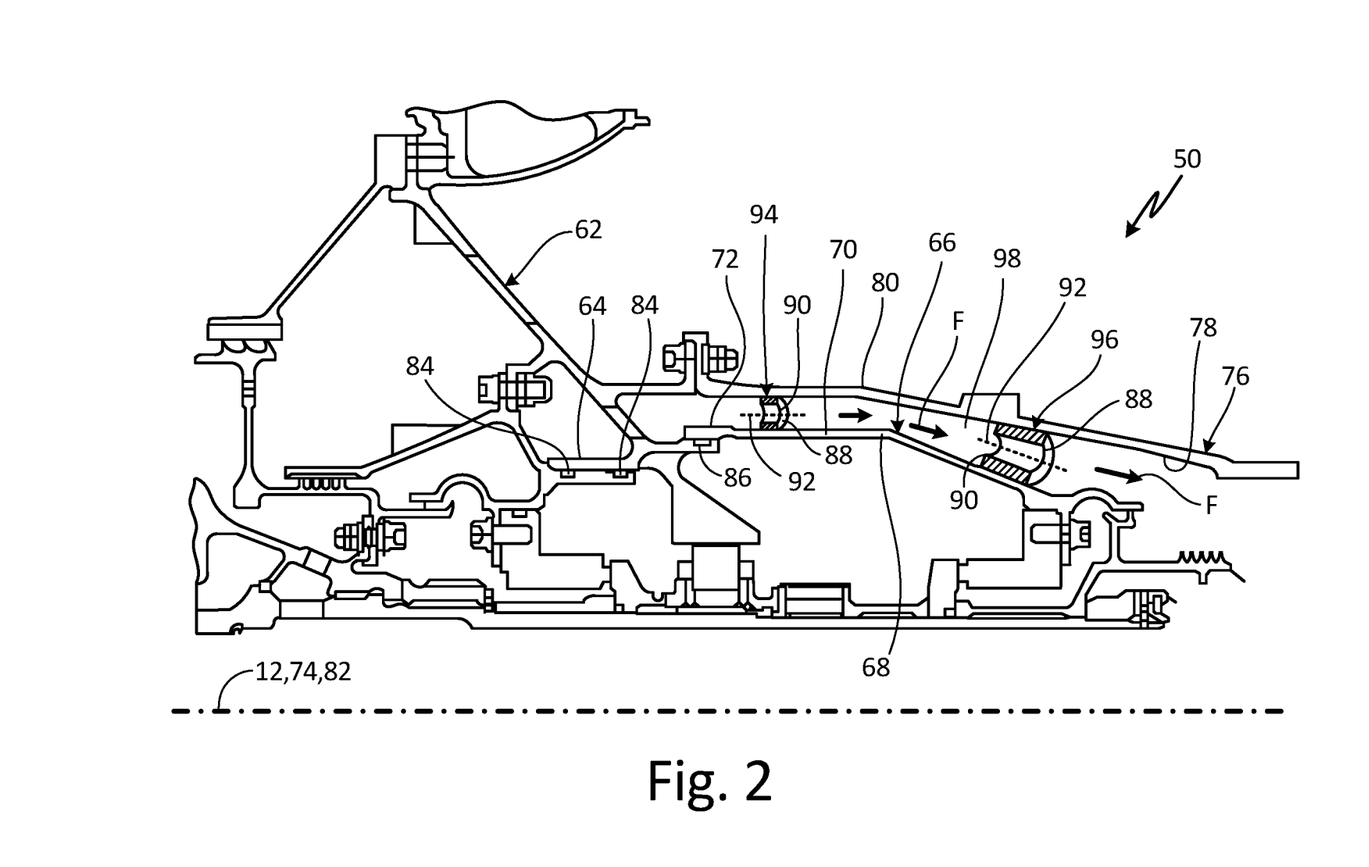
FIG. 2 is a cross-section view of a bearing compartment of the gas turbine engine.

FIG. 2 is a cross-section view of bearing compartment 50 of gas turbine engine 10 and shows bearing compartment 50, bearing housing 62 (with mating surface 64), inner case 66 (with inner surface 68, outer surface 70, mating surface 72, and first axis 74), outer case 76 (with inner surface 78, outer surface 80, second axis 82), forward O-rings 84, aft O-ring 86, resilient support elements 88 (with passages 90 and axes 92), first set 94 of resilient support elements 88, second set 96 of resilient support elements 88, and flowpath 98. Inner case 66, outer case 76, and resilient support elements 88 can also be referred to as a strut assembly. In one non-limiting embodiment, bearing compartment 50 is representative of bearing compartment 50B of gas turbine engine 10. It is to be understood that the following discussion of bearing compartment 50 is applicable to any bearing compartment (e.g., 50A, 50B, or 50C) of gas turbine engine 10 or another type of engine.

Bearing housing 62 is a housing of bearing compartment 50. Mating surface 64 is an annular extension of bearing housing 62. Mating surface 64 can be formed from any metal, such as steel, titanium, and/or nickel, which provides the necessary thermal and mechanical durability and elasticity required for the mating and/or sealing applications of mating surface 64.

Inner case 66, or first annular structure, is a generally annular element of solid material. Inner surface 68 is a generally radially inward facing surface of inner case 66. Outer surface 70 is a generally radially outward facing surface of inner case 66. Mating surface 72 is an annular extension of inner case 66. First axis 74 is an axis passing through a radial center of inner case 66.

Outer case 76, or second annular structure, is a generally annular element of solid material. Inner surface 78 is a generally radially inward facing surface of outer case 76. Outer surface 80 is a generally radially outward facing surface of outer case 76. Second axis 82 is an axis passing through a radial center of outer case 76. Forward O-rings 84 and aft O-ring 86 are ring-shaped seal elements. In one non-limiting embodiment, a material of forward O-rings 84 and/or aft O-ring 86 can include rubber.

Resilient support elements 88, or plurality of struts, are flexible and/or pliable support structures that are elastic. In one non-limiting embodiment, a degree of elasticity of resilient support elements can be from 0% to 99% expansion. In another non-limiting embodiment, a degree of elasticity of resilient support elements 88 can be tailored to meet the design constraints of a given application. The amplitude of vibrations driven by the engine rotor dynamics of gas turbine engine 10 and the ability of the rotating seal to track deflections of the seal plate and handle low delta pressure determine what the elasticity (e.g., flexibility) of resilient support elements 88 (e.g., percentage of expansion) need to be. In one non-limiting embodiment, any resilient support structures 88 can include one of a right circular hollow cylinder, torus, elliptic hollow cylinder, oblique hollow cylinder, bellows, coil spring, leaf spring, or serpentine shape (see e.g., FIGS. 4-11, respectively). In another non-limiting embodiment, a material of resilient support elements 88 can include aluminum, copper, brass, steel, and/or other metals. In other non-limiting embodiments, at least one resilient support element of resilient support elements 88 can include a coefficient of thermal expansion that is different than a coefficient of thermal expansion of at least one of inner case 66 and outer case 76. In another non-limiting embodiment, at least one resilient support element of resilient support elements 88 includes a coefficient of thermal expansion that is greater than a coefficient of thermal expansion of at least one of inner case 66 and outer case 76.

Passages 90 are channels configured to allow transport of a fluid. Axes 92 are lines passing through a center of resilient support elements 88 that extend in an axial direction relative to resilient support elements 88. In one non-limiting embodiment, axes 92 can be equivalent to strut axes. First set 94 and second set 96 are first and second groups of resilient support elements 88. In other non-limiting embodiments, bearing compartment 50 can include more or less than two sets, or axial rows, of resilient support elements 88. Flowpath 98 is a generally annular passage configured for the transport of a fluid.

Bearing housing 62 forms and surrounds a portion of bearing compartment 50. Mating surface 64 extends axially forward within a portion of bearing compartment 50. Inner case 66 is disposed within bearing compartment 50 and is connected to resilient support elements 88. Outer surface 70 of inner case 66 extends along a radially inward portion of, and is fluidly connected to, flowpath 98. Mating surface 72 extends axially forward from and is connected to inner case 66. First axis 74 is disposed along an axial centerline of inner case 66.

Outer case 76 is defines an exterior of bearing compartment 60 and is connected to resilient support elements 88. Outer case 76 surrounds a portion of inner case 66 such that inner case 66 and outer case 76 define flowpath 98 radially between inner case 66 and outer case 76. Outer case 76 is positioned concentrically (e.g., co-axially) with inner case 66. Inner surface 78 of outer case 76 extends along a radially outward portion of, and is fluidly connected to, flowpath 98. Outer surface 80 is disposed along a radially outward portion of outer case 76. Second axis 82 is disposed along an axial centerline of outer case 76. Second axis 82 is disposed co-axially with first axis 74 of inner case 66. Forward O-rings 84 form a sealing interface with mating surface 64 of bearing housing 62. Aft O-ring 86 forms a sealing interface with mating surface 72 of inner case 66.

Each of resilient support elements 88 extends between and is connected to inner case 66 and outer case 76. In one non-limiting embodiment, resilient support elements 88 are welded to inner case 66 and/or to outer case 76. Resilient support elements 88 are disposed in flowpath 98 between inner case 66 and outer case 76. Each of passages 90 extend axially through one of resilient support elements 88. In one non-limiting embodiment, each of axes 92 can be aligned along an axial direction (from left to right in FIG. 2) with first and second axes 74 and 82 of inner case 66 and outer case 76, respectively.

First set 94 of resilient support elements 88 is disposed axially forward of second set 98 of resilient support elements 88. Second set 96 of resilient support elements 88 is disposed axially aft of first set 94 of resilient support elements 88. Flowpath 98 is disposed and is formed radially between inner case 66 and outer case 76. Flowpath 98 is fluidly connected to resilient support elements 88.

During operation of gas turbine engine 10, outer case 76 is subjected to hot fluid (e.g., gas) flows, while inner case 66 experiences significantly lower temperatures. Outer case 76 is exposed to a high temperature environment (e.g., approximately 1000° F. or 538° C.), while inner case is cooled by significantly lower temperature oil (e.g., approximately 150° F. or 66° C.) that inner case 66 contains. In addition, bearing housing 62 of bearing compartment 50 is also exposed to transient thermal gradients (and resulting stresses) due to start-ups and shut-downs as part of the operational cycles of gas turbine engine 10. As a result, the thermal expansion of outer case 76 pulls on inner case 66 in a radially outward direction.

Resilient support elements 88 are configured to maintain concentric positioning between inner case 66 and outer case 76. By way of their annular shape, resilient support elements 88 flex and stretch radially outward as outer case 76 thermally expands when under relatively high temperature loads as compared to inner case 66. First set 94 and second set 96 of resilient support elements 88 are configured to allow relative changes in size between inner case 66 and outer case 76 without deforming inner case 66. As outer case 76 expands, resilient support elements deform while still maintaining a proper gap between inner case 66 and outer case 76 for flowpath 98. Additionally, minimal stresses are transmitted to inner case 66 via resilient support elements 88, thus preventing the occurrences of deformation of inner case 66 such "bi-lobing" or "tri-lobing." Resilient support elements 88 also resist against relative axial, circumferential, lateral, and bending moments between inner case 66 and outer case 76.

Previous designs include struts in the form of solid cylinders extending radially between an inner and outer case. As a result, the thermal expansion of the outer case pulls the inner case radially outward causing deformation of the inner case. This deformation, referred to as "lobing" of the inner case (e.g., "tri-lobing" in the instance of three struts or "bi-lobing" in the instance of two struts), results in an inability to properly seal the inner case with its mating surface allowing air to leak into the bearing compartment.

Instead of rigid pin struts, resilient support elements 88 allow for the thermal growth of outer case 76 without the negative consequences of deforming inner case 66. In one non-limiting embodiment, a stiffness of each of resilient support elements 88 can be tailored and/or optimized to obtain a desired structural integrity and/or spring rate for each of resilient support elements 88. Additionally, resilient support elements 88 can be retro-fit into existing design envelopes without the need to modify existing bearing compartment housings.

Resilient support elements 88 allow for differential thermal growth of outer case 76 with negligible deformation of inner case 66. As a result, inner case 66 can seal properly with mating surface 72 thus preventing unwanted air ingress into bearing compartment 50. Resilient support elements 88 provide a robust and lightweight solution enabling resilient support elements 88 to be inserted in the space (e.g., flowpath 98) between inner and outer cases 66 and 76 and welded into place. Resilient support elements 88 provide additional axial stiffness for inner and outer cases 66 and 76 as well as allow unrestricted airflow between inner and outer cases 66 and 76 via passages 90.

Figure 3A:
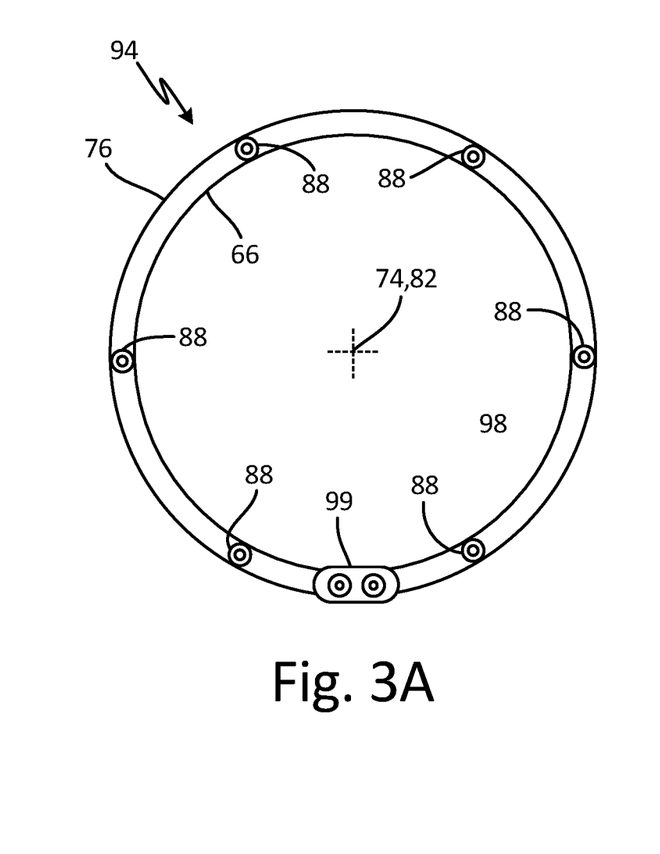
FIG. 3A is a cross-section view in the downstream direction of an inner case, an outer case, and first struts of the bearing compartment.
Figure 3B:
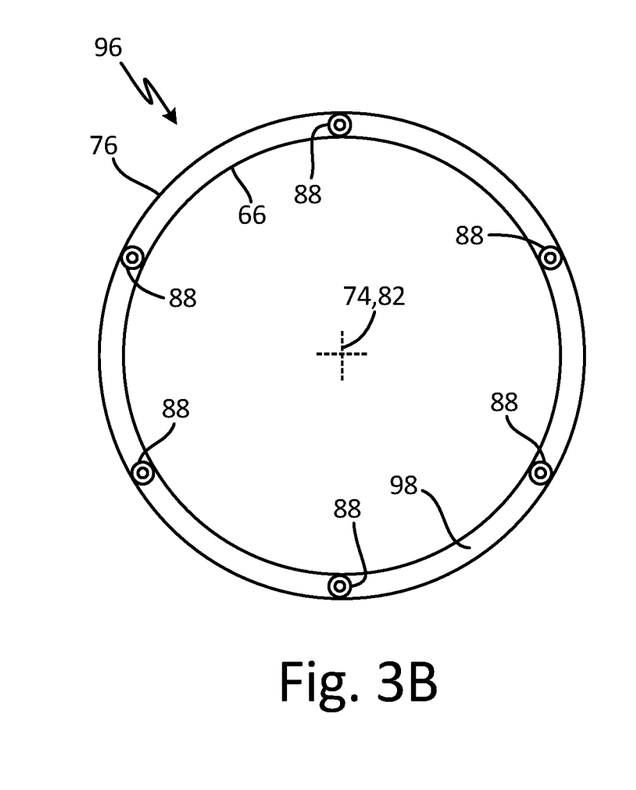
FIG. 3B is a cross-section view in the downstream direction of the inner case, the outer case, and second struts of the bearing compartment.

FIG. 3A is a cross-section view in the downstream direction of first set 94 of resilient support elements 88 and shows inner case 66 (with first axis 74), outer case 76 (with second axis 82), first set 94 of resilient support elements 88, flowpath 98, and oil scavenge port 99. FIG. 3B is a cross-section view in the downstream direction of second set 96 of resilient support elements 88 and shows inner case 66, outer case 76, second set 96 of resilient support elements 88, and flowpath 98. FIGS. 3A and 3B will be discussed in unison.

As shown in FIGS. 3A and 3B, inner case 66 and outer case 76 are positioned concentrically (e.g., share a same center or center point) such that first axis 74 of inner case 66 and second axis 82 of outer case 72 are co-axial and occupy the same location and are aligned (e.g., parallel and/or collinear) with each other.

In one non-limiting embodiment, first set 94 of resilient support elements 88 includes a first circumferential clocking configuration between circumferentially consecutive resilient support elements 88 about a circumference of inner case 66 such that there is uniform spacing between each resilient support element 88 of first set 94 of resilient support elements 88. As used herein, the term "clocking" refers to the fixed circumferential positioning of resilient support elements 88 in one row (e.g., first set 94) in relation to the circumferential positioning of resilient support elements 88 in a nearby row (e.g., second set 96). In another non-limiting embodiment, first set 94 of resilient support elements 88 can include two or more resilient support elements. In another non-limiting embodiment, first set 94 of resilient support elements 88 can include a circumferential clocking configuration between circumferentially consecutive resilient support elements 88 about a circumference of inner case 66 such that there is non-uniform spacing between each resilient support element 88 of first set 94.

In one non-limiting embodiment, second set 96 of resilient support elements 88 can include a second circumferential clocking configuration between circumferentially consecutive resilient support elements 88 about a circumference of inner case 66 such that there is uniform spacing between each resilient support element 88 of second set 96 of resilient support elements 88. In another non-limiting embodiment, the second circumferential clocking configuration of second set 96 resilient support elements 88 can be circumferentially off-set from the first circumferential clocking configuration of first set 94 of resilient support elements 88. For example, each resilient support element 88 in second set 96 is not aligned, or is misaligned, along an axial direction (into and out of the page in FIGS. 3A and 3B). For example, as shown in FIGS. 3A and 3B, second set 96 of resilient support elements 88 is off-set from first set 94 of resilient support elements 88 by approximately 30°. In other non-limiting embodiments, second plurality of resilient support elements 88 can be off-set from first set 94 of resilient support elements 88 by an angle of between 0° to 360°. In another non-limiting embodiment, second plurality of resilient support elements 88 can be axially aligned with first set 94 of resilient support elements 88 such that there is no circumferential or clocking off-set between second set 96 and first set 94.

In one non-limiting embodiment, second set 96 of resilient support elements 88 can include two or more resilient support elements. In another non-limiting embodiment, second set 96 of resilient support elements 88 can include a circumferential clocking configuration between circumferentially consecutive resilient support elements 88 about a circumference of inner case 66 such that there is non-uniform spacing between each resilient support element 88 of second set 96.

The off-set clocking relationship between first set 94 and second set 96 of resilient support elements 88 provides a more evenly spread load distribution between inner case 66 and outer case 76. This more evenly spread load distribution decreases the negative effects from relative thermal deformation my maintaining a proper gap between inner case 66 and outer case 76 such that a size of flowpath 98 remains generally consistent during operation of gas turbine engine 10.

Figure 4:
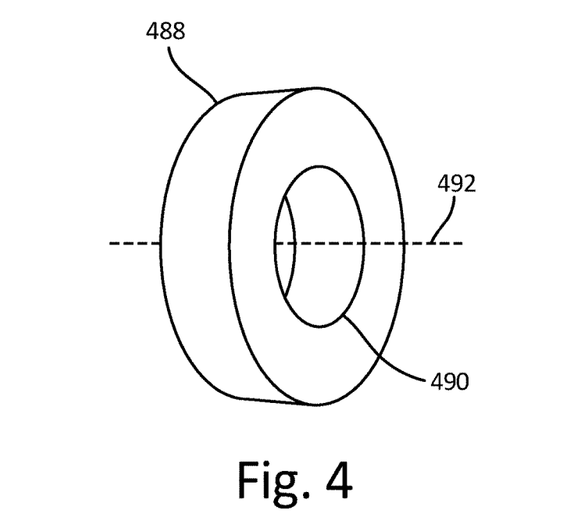
FIG. 4 is a perspective view of a resilient support element in the shape of a right circular hollow cylinder.

FIG. 4 shows a perspective view of resilient support element 488 with passage 490 and axis 492. Resilient support element 488 is a tube of solid material in the shape of a right circular hollow cylinder. In one non-limiting embodiment, a material of resilient support element 488 can include aluminum, copper, brass, steel, or other metal. Resilient support element 488 is disposed radially between, is connected to, and is attached to inner case 66 and outer case 76 (as discussed in FIGS. 2, 3A, and 3B with respect to resilient support elements 88).

The cylindrical shape allows resilient support element 488 to be more flexible along a radial direction (relative to inner case 66 and outer case 76) as compared to existing support struts, which include a solid piece of material without a passage such as a peg. Due to its cylindrical shape, resilient support element 488 also resists against relative axial, circumferential, lateral, and bending moments between inner case 66 and outer case 76.

Figure 5:
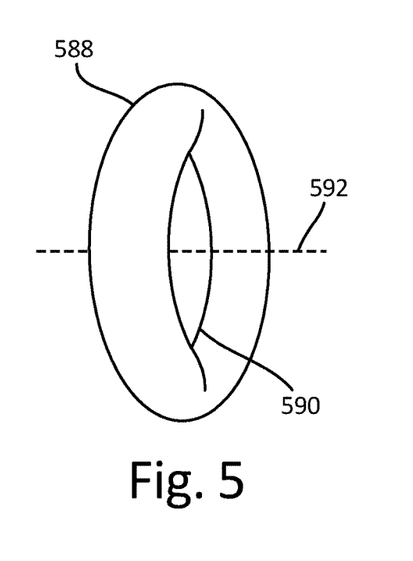
FIG. 5 is a perspective view of a resilient support element in the shape of a torus.

FIG. 5 shows a perspective view of resilient support element 588 with passage 590 and axis 592. Resilient support element 588 is a ring of solid material in the shape of a torus.

Resilient support element 588 differs from other discussed configurations of resilient support elements 88 in that contact points of resilient support element 588 between inner case 66 and outer case 76 include a smaller axial length. For example, resilient support element 588 contacts inner case 66 at a single axial point and to outer case 76 at another single axial point due to the curved, toroidal surface of resilient support element 588. These singular axial contact points allow for more axial displacement between inner case 66 and outer case 76.

Figure 6:
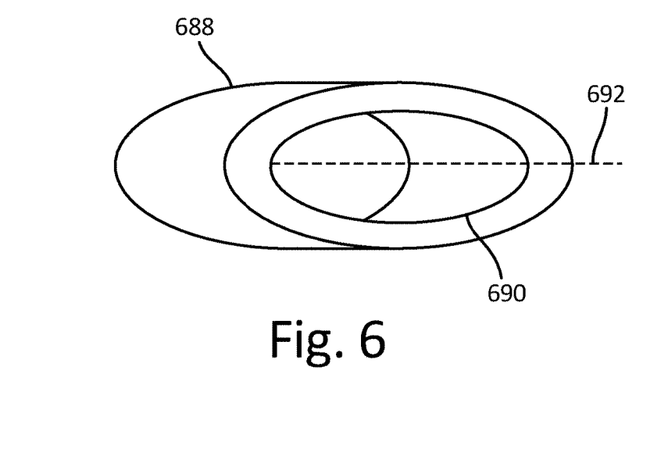
FIG. 6 is a perspective view of a resilient support element in the shape of an elliptic hollow cylinder.

FIG. 6 shows a perspective view of resilient support element 688 with passage 690 and axis 692. Resilient support element 688 is a tube of solid material in the shape of an elliptic hollow cylinder. With its elliptical cross-section shape, resilient support element 688 includes a spring constant different from a circular hollow cylinder such as resilient support element 488. For example, resilient support element 688 is capable of greater deflection along its minor axis that does a circular hollow cylinder. In other non-limiting embodiments, points of contact between resilient support element 688 and inner case 66 and outer case 76 can be located at varying points around an exterior of resilient support element 688, such as for example at points located along either a major or minor axis of the elliptical cross-section of resilient support element 688 or at points not located along the minor or major axes of the elliptical cross-section of resilient support element 688. In other non-limiting embodiments, an eccentricity of resilient support element 688 can be between 0 and 1.

Figure 7:
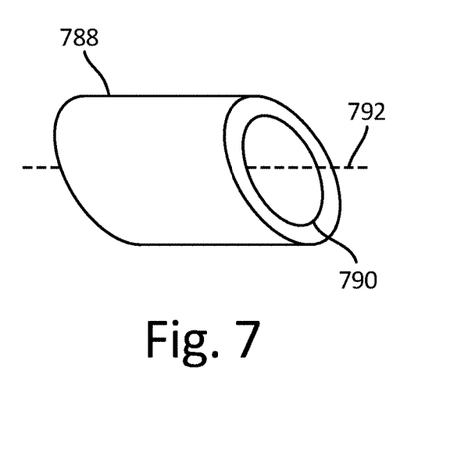
FIG. 7 is a perspective view of a resilient support element in the shape of an oblique hollow cylinder.

FIG. 7 shows a perspective view of resilient support element 788 with passage 790 and axis 792. Resilient support element 788 is a tube of solid material in the shape of an oblique hollow cylinder. In one non-limiting embodiment, an angle of obliqueness of end-faces of resilient support element 788 can be varied to provide desired relative axial, circumferential, lateral, and bending moments between inner case 66 and outer case 76. In other non-limiting embodiments, the end-faces of resilient support element 788 can extend along parallel planes (as shown in FIG. 7) or can extend along non-parallel planes.

In some non-limiting embodiments, a radial thickness of each resilient support elements 88, 488, 588, 688, and/or 788 can adjusted to match certain vibration modes in gas turbine engine 10. Other dimensions such as length and width of resilient support elements 88, 488, 588, 688, and/or 788 can be adjusted based on desired vibration characteristics or degree of dampening in order to respond to the natural frequencies of inner case 66 and outer case 76. In another non-limiting embodiment, the radial thickness of each resilient support element 88, 488, 588, 688, and/or 788 can vary along an angular position such that some portions of each resilient support element 88, 488, 588, 688, and/or 788 can be thinner or thicker than other portions of each resilient support elements 88, 488, 588, 688, and/or 788. These variations can be used to adjust or tailor a spring rate of resilient support elements 88 to provide desired flexibility characteristics of resilient support elements 88, 488, 588, 688, and/or 788.

Figure 8:
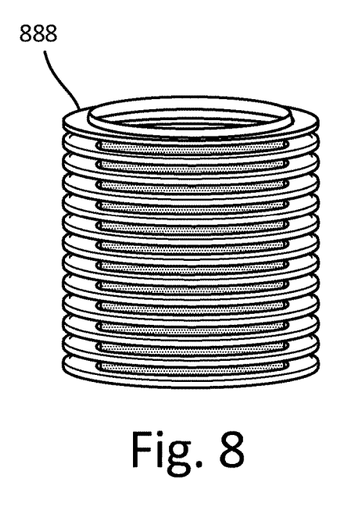
FIG. 8 is a side perspective view of a resilient support element in the shape of a bellows.

FIG. 8 shows a side perspective view of resilient support element 888. Resilient support element 888 is in the shape of a bellows. In one non-limiting embodiment, resilient support element 888 can include a sealed, or vacuum, metallic bellows. For example, a sealed air/gas volume of fluid (e.g., gas) in resilient support element 888 provides an elastic response when the exterior of resilient support element 888 is moved (i.e., compressed or expanded). In one non-limiting embodiment, the degree of compressibility of the fluid can based on desired vibration characteristics or degree of dampening in order to respond to the natural frequencies of inner case 66 and/or outer case 76. In another non-limiting embodiment, resilient support element 888 can include an opened, or valve controlled, metallic bellows. For example, resilient support element 888 can include an inlet orifice or valve to draw fluid into resilient support element 888 and a small exit orifice to discharge fluid. As long as there is some differential pressure inside this type of bellows (e.g., opened or valve controlled), then a similar dynamic response to a dynamic response from the sealed type of bellows can be delivered when an exterior of resilient support element 888 is moved (i.e., compressed or expanded).

In another non-limiting embodiment, instead of inlet and/or outlet valves, resilient support element 888 can include calibrated orifices so that a net differential pressure is always maintained inside resilient support element 888 to provide additional dynamic response (due to the compression of the fluid inside resilient support element 888). The inlet and outlet orifices can be calibrated such that an optimal differential gas pressure is maintained within resilient support element 888 at all times. The specific orientation of the inlet and outlet orifices can be such that their positioning optimizes the functionality of resilient support element 888 while keeping a weight and/or size of resilient support element 888 to a minimum.

Figure 9:
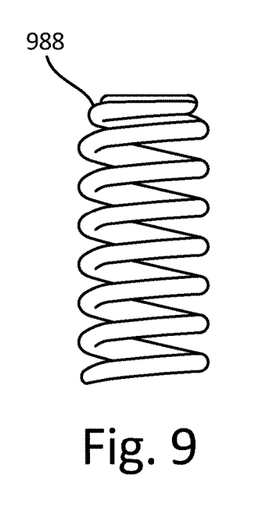
FIG. 9 is a side view of a resilient support element in the shape of a coil spring.

FIG. 9 shows a side view of resilient support element 988. Resilient support element 988 is in the shape of a coil spring. In one non-limiting embodiment, resilient support element 988 can be positioned relative to inner case 66 and outer case 76 such that an axial direction of resilient support element 988 (in an up and down direction in FIG. 9) can be axially aligned with centerline 12 (shown in FIG. 1), first axis 74 of inner case 66, and second axis 82 of outer case 76.

In another non-limiting embodiment, resilient support element 988 can be positioned relative to inner case 66 and outer case 76 such that an axial direction of resilient support element 988 (in an up and down direction in FIG. 9) can be perpendicular with centerline 12 (shown in FIG. 1), first axis 74 of inner case 66, and second axis 82 of outer case 76. The selection of the stiffness constant, k, of resilient support element 988 can based on desired vibration characteristics or degree of dampening in order to respond to the natural frequencies of inner case 66 and outer case 76.

Figure 10:
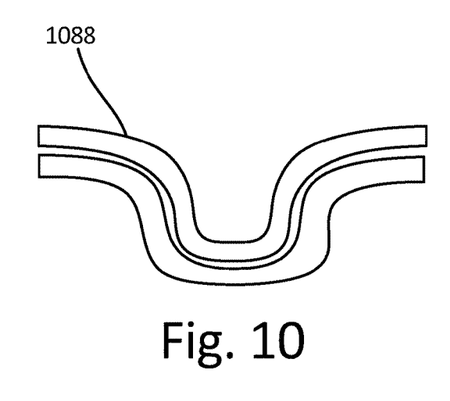
FIG. 10 is a perspective view of a resilient support element in the shape of a leaf spring.

FIG. 10 shows a perspective view of resilient support element 1088. Resilient support element 1088 is in the shape of a leaf spring. Resilient support element 1088 includes at least one leaf, or arc-shaped piece of solid material such as metal. In some non-limiting embodiments, resilient support element 1088 can be attached and connected to inner case 66 and outer case 76 in a variety of different orientations such that resilient support element 1088 flexes and bends as outer case 76 undergoes thermal growth during operation of gas turbine engine 10 in order to maintain concentric positioning between inner and outer cases 66 and 76 and allow relative changes in size between inner and outer cases 66 and 76 without deforming inner case 66. In other non-limiting embodiments, resilient support element 1088 can include one or more leaves so as to provide a desirable spring rate.

Figure 11:
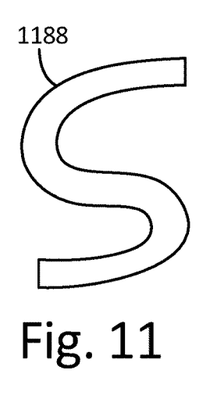
FIG. 11 is a perspective view of a resilient support element in a serpentine shape.

FIG. 11 shows a perspective view of resilient support element 1188. Resilient support element 1188 has a serpentine. Resilient support element 1188 includes at least one serpentine, or S-shaped piece of solid material such as metal. In some non-limiting embodiments, resilient support element 1188 can be attached and connected to inner case 66 and outer case 76 in a variety of different orientations such that resilient support element 1188 flexes and bends as outer case 76 undergoes thermal growth during operation of gas turbine engine 10 in order to maintain concentric positioning between inner and outer cases 66 and 76 and allow relative changes in size between inner and outer cases 66 and 76 without deforming inner case 66. In other non-limiting embodiments, resilient support element 1188 can include one or more serpentines (e.g., bends or corners) so as to provide a desirable spring rate.

Discussion of Possible Embodiments

The following are non-exclusive descriptions of possible embodiments of the present invention.

A strut assembly for a bearing compartment of a gas turbine engine includes an inner case, an outer case, and a first plurality of struts. The inner case is disposed within the bearing compartment and includes a first axis. The outer case defines an exterior of the bearing compartment and includes a second axis disposed co-axially with the first axis. The inner and outer cases define a flowpath between the inner and outer cases. Each strut of the first plurality of struts extends between and is connected to the inner and outer cases. The first plurality of struts is configured to maintain concentric positioning between the inner and outer cases and to allow relative changes in size between the inner and outer cases without deforming the inner case.

The strut assembly of the preceding paragraph can optionally include, additionally and/or alternatively, any one or more of the following features, configurations and/or additional components.

Each strut of the first plurality of struts can comprise a fluidic passage extending axially through the strut.

Each strut of the first plurality of struts can comprise a coil spring, a leaf spring, a serpentine, or a bellows.

A shape of one of the struts of the first plurality of struts can comprise a hollow cylinder with a strut axis, wherein the strut axis can be aligned along an axial direction with the first and/or second axes of the inner and outer cases.

The shape of one of the struts of the first plurality of struts can comprise a right circular hollow cylinder, an elliptic hollow cylinder, an oblique hollow cylinder, or a torus.

The first plurality of struts can comprise a first circumferential clocking configuration between consecutive struts about the circumference of the inner case such that there can be uniform spacing between each strut of the first plurality of struts.

A second plurality of struts can be disposed axially aft of the first plurality of struts.

The second plurality of struts can comprise a second circumferential clocking configuration between consecutive struts about the circumference of the inner case, wherein the second circumferential clocking configuration can be off-set from the first circumferential clocking configuration.

At least one strut of the plurality of struts can include a coefficient of thermal expansion that is different than a coefficient of thermal expansion of at least one of the inner case and the outer case.

A bearing compartment of a gas turbine engine includes a first annular structure, a second annular structure, and a plurality of resilient support elements. The second annular structure defines an exterior of a bearing housing of the bearing compartment and surrounds a portion of the first annular structure. The second annular structure is disposed co-axially with the first annular structure such that the first and second annular structures define a flowpath located radially between the first and second annular structures. The resilient support elements are disposed between the first and second annular structures such that each resilient support element is connected to the first annular structure and the second annular structure. Each resilient support element is configured to radially deform upon thermal expansion of the second annular structure so as to maintain the shape of the first annular structure.

The bearing compartment of the preceding paragraph can optionally include, additionally and/or alternatively, any one or more of the following features, configurations and/or additional components.

Each the plurality of resilient support elements can comprise a hollow cylinder.

A shape of each the plurality of resilient support elements can comprise a right circular hollow cylinder, an elliptic hollow cylinder, an oblique hollow cylinder, or a torus.

The plurality of resilient support elements can further comprise a first plurality of resilient support elements, wherein the first plurality of resilient support elements can comprise a first clocking configuration between consecutive resilient support elements such that there can be uniform circumferential spacing between each resilient support element of the first plurality of resilient support elements.

The plurality of resilient support elements can further comprise a second plurality of resilient support elements, wherein the second plurality of resilient support elements can comprise a second clocking configuration between circumferentially consecutive resilient support elements, wherein the second clocking configuration can be off-set from the first clocking configuration.

At least one resilient support element of the plurality of resilient support elements can include a coefficient of thermal expansion that is greater than a coefficient of thermal expansion of at least one of the inner case and the outer case.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A strut assembly for a bearing compartment of a gas turbine engine, the strut assembly comprising:
   an inner case disposed within the bearing compartment, the inner case having a first axis, the first axis being a first radially central axis;
   an outer case defining an exterior of the bearing compartment, the outer case having a second axis, the second axis being a radially central axis that is co-axial with the first axis, wherein the inner and outer cases define a flowpath therebetween; and
   a first plurality of struts configured to maintain concentric positioning between the inner case and outer case, wherein each strut of the first plurality of struts extends between and is connected to the inner case and outer case, wherein the first plurality of struts is resiliently deformable between the outer case and inner case whereby a change in size in one of the outer case and inner case is radially isolated from the other of the outer case and inner case.

2. The strut assembly of claim 1, wherein each strut of the first plurality of struts comprises a fluidic passage extending through the strut.

3. The strut assembly of claim 1, wherein each strut of the first plurality of struts is elastic.

4. The strut assembly of claim 1, wherein each strut of the first plurality of struts comprises a coil spring, a leaf spring, a serpentine, or a bellows.

5. The strut assembly of claim 1, wherein a shape of one of the struts of the first plurality of struts comprises a hollow cylinder with a strut axis, wherein the strut axis is aligned along an axial direction with the first and second axes of the inner and outer cases.

6. The strut assembly of claim 5, further wherein the shape of one of the struts of the first plurality of struts comprises a right circular hollow cylinder, an elliptic hollow cylinder, an oblique hollow cylinder, or a torus.

7. The strut assembly of claim 1, wherein the first plurality of struts comprises a first circumferential clocking configuration between consecutive struts about the circumference of the inner case such that there is uniform spacing between each strut of the first plurality of struts.

8. The strut assembly of claim 7 further comprising a second plurality of struts disposed axially aft of the first plurality of struts.

9. The strut assembly of claim 8, wherein the second plurality of struts comprises a second circumferential clocking configuration between consecutive struts about the circumference of the inner case, wherein the second circumferential clocking configuration is off-set from the first circumferential clocking configuration.

10. The strut assembly of claim 1, wherein at least one strut of the plurality of struts includes a coefficient of thermal expansion that is different than a coefficient of thermal expansion of at least one of the inner case and the outer case.

11. A bearing compartment of a gas turbine engine, the bearing compartment comprising:
   a first annular structure;
   a second annular structure defining an exterior of a bearing housing of the bearing compartment and surrounding a portion of the first annular structure, wherein the second annular structure is disposed co-axially with the first annular structure, wherein the first and second annular structures define a flowpath located radially between the first and second annular structures; and
   a plurality of resilient support elements disposed between the first and second annular structures, wherein each of the plurality of resilient support structures is connected to the first annular structure and the second annular structure, and further wherein each of the plurality of resilient support structures is configured to radially deform upon thermal expansion of the second annular structure so as to maintain the shape of the first annular structure.

12. The bearing compartment of claim 11, wherein each resilient support element comprises a hollow cylinder.

13. The bearing compartment of claim 12, wherein a shape of each resilient support element comprises a right circular hollow cylinder, an elliptic hollow cylinder, an oblique hollow cylinder, or a torus.

14. The bearing compartment of claim 11, wherein each resilient support element is elastic.

15. The bearing compartment of claim 11, wherein the plurality of resilient support elements further comprises a first plurality and a second plurality of resilient support elements, wherein the first plurality of resilient support elements comprises a first clocking configuration between consecutive resilient support elements such that there is uniform circumferential spacing between each resilient support element of the first plurality of resilient support elements.

16. The bearing compartment of claim 15, wherein the second plurality of resilient support elements comprises a second clocking configuration between circumferentially consecutive resilient support elements, wherein the second clocking configuration is off-set from the first clocking configuration.

17. The bearing compartment of claim 11, wherein at least one resilient support element of the plurality of resilient support elements includes a coefficient of thermal expansion that is greater than a coefficient of thermal expansion of at least one of the inner case and the outer case.

* * * * *